S. DOUGAN.
POULTRY TROUGH.
APPLICATION FILED JULY 8, 1908.

908,217. Patented Dec. 29, 1908.

Witnesses:
Joe P. Mahler,
K. Allen.

Inventor,
Stanley Dougan,
By Victor J. Evans
Attorney.

UNITED STATES PATENT OFFICE.

STANLEY DOUGAN, OF PAWNEE, OKLAHOMA.

POULTRY-TROUGH.

No. 908,217.      Specification of Letters Patent.      Patented Dec. 29, 1908.

Application filed July 8, 1908. Serial No. 442,621.

*To all whom it may concern:*

Be it known that I, STANLEY DOUGAN, a citizen of the United States of America, residing at Pawnee, in the county of Pawnee and State of Oklahoma, have invented new and useful Improvements in Poultry-Troughs, of which the following is a specification.

This invention relates to poultry troughs, and one of the principal objects of the same is to provide a sheet metal trough for feeding and watering poultry which will not permit the poultry to stand upon the trough and which will always keep the feed or water clean.

Another object of the invention is to provide a trough in which there is a central sliding partition which divides the trough in the center and compels the poultry to feed or drink from opposite sides of the trough, and which will not permit the birds to stand upon the top of the trough to feed or drink.

In poultry troughs as at present constructed no provision is made to preserve the food or water in a sanitary condition, since they are constructed to permit the poultry to fly on top of the troughs and to waste the feed and to render it unfit for use. In my trough the sliding partition divides the trough into narrow longitudinal compartments which will not permit the birds to fly on the edge and drink out of the trough, compelling them to remain upon the ground in order to utilize the trough.

These and other objects may be attained by means of the construction illustrated in the accompanying drawing, in which—

Figure 1:
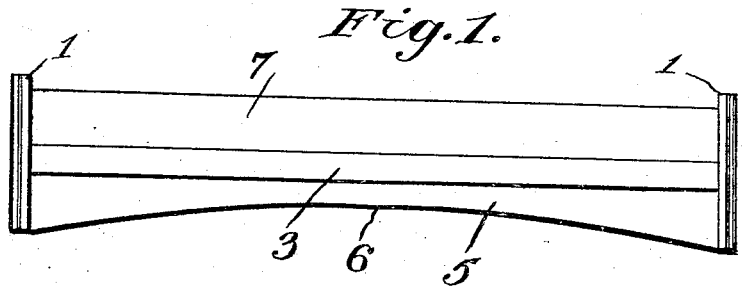
Figure 2:
Figure 3:
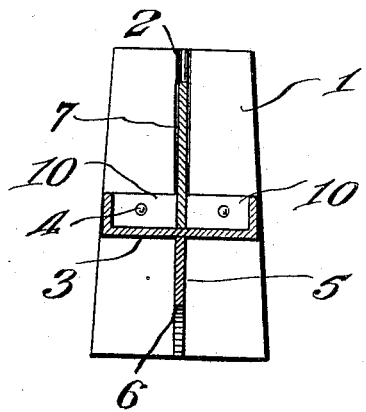
Figure 4:
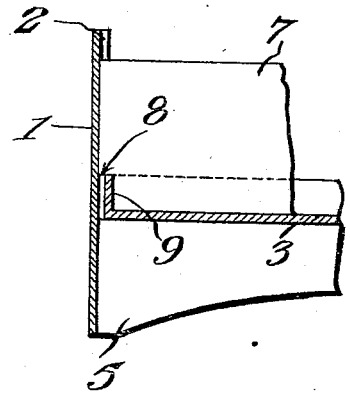

Figure 1 is a side elevation of a poultry trough made in accordance with my invention. Fig. 2 is a top plan view of the same. Fig. 3 is a vertical sectional view taken transversely of the trough. Fig. 4 is a detail vertical section, showing the manner in which the sliding partition fits in the trough.

Referring to the drawing, the numerals 1 designate the ends of the trough which, as shown in Fig. 3, are somewhat wider at their lower ends than at their upper ends. The ends 1 are provided with interior grooves 2, and secured at its ends to the end parts 1 by rivets 4 is a shallow sheet metal trough 3. A brace 5 having a curved lower edge 6 is secured in the groove 2 underneath the trough 3. This brace may be driven in place and held by friction.

A sliding partition 7 provided with a shoulder 8 and a reduced portion 9 fits within the grooves 2, as shown in Fig. 4, the reduced portion 9 extending to the bottom of the trough 3 and the shoulder 8 resting on top of the ends of the trough. This partition may be readily withdrawn for cleaning or for any other purpose, and the feed or water placed within the trough will be divided into two narrow, shallow chambers 10.

From the foregoing, it will be obvious that a poultry trough made in accordance with my invention will not permit the poultry to stand upon the top and eat or drink from the trough owing to the fact that the feed chambers 10 in the trough are comparatively narrow and shallow. Thus the poultry will remain upon the ground and feed from the trough, saving feed and preventing the fouling of the trough.

The cost of manufacture of a trough such as I have described would be slight, and the advantages of such a trough are many and great.

I claim:—

1. A poultry trough comprising end parts having grooves on their inner sides, a brace extending from one end to the other and fitted in the groove, said brace having a curved lower edge, a shallow trough secured to the end parts, a sliding partition fitted in the grooves above the trough and designed to divide said trough into narrow compartments, said partition having a reduced lower end, and a shoulder, for the purpose described.

2. A poultry trough comprising end parts each having a groove upon its inner side, a brace extending from one end part to the other and fitted in said grooves, a trough secured to said end parts above said brace, and a sliding partition fitted in the grooves above the trough, said partition being removable.

In testimony whereof I affix my signature in presence of two witnesses.

STANLEY DOUGAN.

Witnesses:
H. T. CONLEY,
W. E. MCNEILL.